(12) United States Patent
Proffitt et al.

(10) Patent No.: US 6,549,870 B2
(45) Date of Patent: Apr. 15, 2003

(54) WEIGHTED SETBACK REPORTING THERMOSTAT

(75) Inventors: Jerry L. Proffitt, Wabash, IN (US); Raymond J. Archacki, Jr., Wethersfield, CT (US)

(73) Assignee: Carrier Corporation, Syracuse, NY (US)

( * ) Notice: Subject to any disclaimer, the term of this patent is extended or adjusted under 35 U.S.C. 154(b) by 98 days.

(21) Appl. No.: 09/740,654

(22) Filed: Dec. 20, 2000

(65) Prior Publication Data
US 2002/0077774 A1 Jun. 20, 2002

(51) Int. Cl.⁷ .................. G06F 15/00; G05D 23/00; F24F 11/00
(52) U.S. Cl. ................. 702/130; 236/47; 236/94; 165/238
(58) Field of Search ............... 702/130, 178; 364/138, 505; 236/46, 47, 78, 51; 340/825.31; 62/180

(56) References Cited

U.S. PATENT DOCUMENTS

| | | | | |
|---|---|---|---|---|
| 4,685,614 A | * | 8/1987 | Levine | 236/78 |
| 4,881,686 A | * | 11/1989 | Mehta | 236/46 |
| 5,179,524 A | * | 1/1993 | Parker et al. | 364/505 |
| 5,197,668 A | * | 3/1993 | Ratz et al. | 236/51 |
| 5,219,119 A | * | 6/1993 | Kasper et al. | 702/130 |
| 5,395,042 A | * | 3/1995 | Riley et al. | 236/46 |
| 5,461,372 A | * | 10/1995 | Busak et al. | 340/825.31 |
| 5,476,221 A | * | 12/1995 | Seymour | 236/47 |
| 5,544,809 A | * | 8/1996 | Keating et al. | 236/44 C |
| 5,706,191 A | * | 1/1998 | Bassett et al. | 364/138 |
| 5,801,940 A | * | 9/1998 | Russ et al. | 364/138 |
| 5,822,997 A | * | 10/1998 | Atterbury | 62/180 |
| 5,926,776 A | * | 7/1999 | Glorioso et al. | 702/130 |
| 6,254,009 B1 | * | 7/2001 | Proffitt et al. | 236/47 |

FOREIGN PATENT DOCUMENTS

EP 0527467 * 8/1992 ......... G05D/23/275

* cited by examiner

Primary Examiner—John Barlow
Assistant Examiner—Aditya S Bhat
(74) Attorney, Agent, or Firm—William F. White

(57) ABSTRACT

A thermostat receives requests to enter into setback modes of operation whereby at least one setpoint normally used by the thermostat is changed. The thermostat is operative to compute the integral of change in setpoint temperature over time during each setback mode of operation. The thermostat is also operative to maintain a running total of such computed integrals of change in setpoint temperature over time in order to respond to any request for such computed integrals. The thermostat is furthermore operative to set the total of such computed integrals of change in setpoint temperature over time equal to zero in response to a request to clear the total of such computed integrals of change in setpoint temperature over time. The thermostat will furthermore compute the integral of temperature offset occurring over any time left in any present setback mode of operation after implementing a requested clearing so as to thereby initiate the computation of a new running total of computed integrals of temperature offset occurring over time spent in setback modes of operation that are implemented after the clearing.

14 Claims, 5 Drawing Sheets

WEIGHTED SETBACK REPORTING THERMOSTAT

BACKGROUND OF THE INVENTION

The present invention relates to thermostats having the capability of tracking, recording, and reporting setback information to a remotely located entity.

Thermostats have heretofore received and implemented setbacks of locally programmed setpoints in response to receiving setback information from a remotely located source such as an energy provider. An example of such a thermostat is disclosed in commonly assigned U.S. patent application Ser. No. 09/456,355 entitled "Communicating Thermostat". Thermostats have also heretofore maintained a running total as to the amount of time a thermostat has spent in one or more commanded setbacks. The running total of the amount of time is made available upon request to the energy provider. An example of such a thermostat is disclosed in commonly assigned U.S. patent application Ser. No. 09/594,974 entitled "Setback Reporting Thermostat". This latter thermostat while reporting useful information as to the amount of time spent in one or more setbacks does not however provide an indication as to the amount of temperature offset occurring during the various setback periods. This latter information would be useful to an energy provider who could then reward or credit an energy user who saves more energy by implementing setbacks over time at a higher temperature offset than another energy user that was only willing to implement setbacks at lower temperature offsets.

SUMMARY OF THE INVENTION

The present invention provides a thermostat with the capability of tracking both the amount of time and temperature offset being implemented during setback modes of operation. The thermostat computes the integral of the implemented temperature offset occurring over the elapsed time in a presently occurring setback mode of operation in response to a request for setback information from a remotely located entity. The computed integral of temperature offset occurring over time is thereafter provided to the remotely located entity which is usually an energy provider seeking an accurate record of temperature offset over time.

The thermostat is also capable in the preferred embodiment of maintaining a running total of computed integrals of temperature offset occurring over time spent in previously implemented setbacks. The running total of such computed integrals of temperature offset occurring over time spent in previously implemented setbacks is preferably summed with the integral of temperature offset occurring over any elapsed time in a presently occurring setback mode of operation before responding to the request from the remotely located entity.

The thermostat also preferably provides the remotely located entity with an option of either clearing or not clearing the running total of computed integrals of temperature offset occurring over time summed with any currently computed integral of temperature offset occurring over time. The thermostat will furthermore compute the integral of temperature offset occurring over any time left in any present setback mode of operation after implementing a requested clearing so as to thereby initiate the computation of a new running total of computed integrals of temperature offset occurring over time spent in setback modes of operation that are implemented after the clearing.

BRIEF DESCRIPTION OF THE DRAWINGS

For a fuller understanding of the present invention, reference should now be made to the following detailed description taken in conjunction with the accompanying drawings, wherein.

DESCRIPTION OF THE PREFERRED EMBODIMENTS

Figure 1:
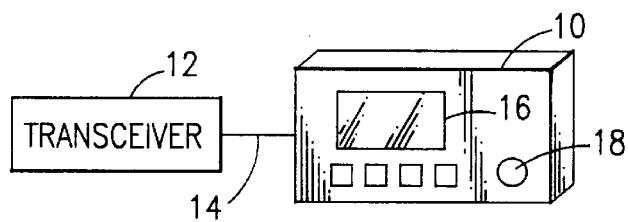
FIG. 1 is a block diagram of a thermostat and transceiver, wherein the transceiver is in communication with a remotely located device (not shown) so as to thereby receive and/or transmit information to the remotely located device.

Referring to FIG. 1, a thermostat 10 is operatively connected to a transceiver 12 via a communication line 14 so as to receive or transmit information to the transceiver 12. The transceiver 12 provides a communication link between the thermostat 10 and a remotely located device (not shown), which provides setpoint control information to the thermostat 10. The remotely located device is preferably controlled by an energy provider seeking to provide cost effective setpoint control information to the thermostat 10.

The thermostat preferably causes messages to be displayed on a display 16 in response to receipt of information from the remotely located device that is preferably controlled by an energy provider. This includes the display of a message that the thermostat is in a setback mode of operation wherein the locally entered setpoint has been adjusted or altered in response to a request from the remotely located device preferably controlled by an energy provider. A touch sensitive button 18 on the front panel of the thermostat can be depressed any time one wishes to override the setback mode of operation.

Figure 2:
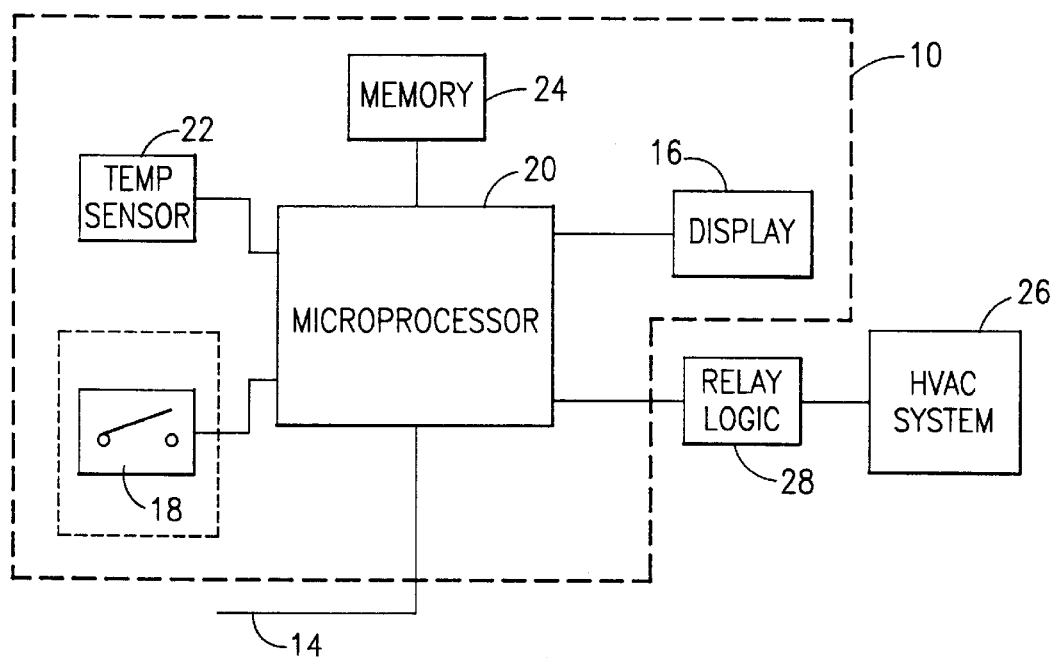
FIG. 2 is a block diagram of elements within the thermostat including a microprocessor that is responsive to signals from the transceiver.

Referring to FIG. 2, the touch-sensitive button 18 is illustrated as a switch connected to a microprocessor 20 which is in turn connected to the display 16. The microprocessor 20 is also connected to a temperature sensor 22 and a memory 24. The microprocessor normally executes one or more control programs stored in memory 24, which monitor any variation of the temperature indicated by the sensor 22 with respect to one or more locally entered setpoints preferably stored in the memory 24. These control programs cause the microprocessor to control an HVAC system 26 through relay logic 28 so as to thereby heat or cool the space in which the thermostat is located.

The microprocessor 20 also executes a program stored in memory 24, which processes information received from the transceiver 12 via the line 14. This latter program, when executed by the microprocessor, will preferably implement adjustments to the locally entered setpoints that have been stored in the memory 24. The microprocessor will thereafter execute the one or more control programs stored in the memory 24 so as to monitor any variation of the temperature indicated by the temperature sensor 22 with respect to the now modified setpoints. The program will furthermore cause the microprocessor to track and maintain an accurate record of the amount of time during which the thermostat remains in this setback or curtailment mode of operation. The program processor will moreover maintain a record of any past setback or curtailment modes of operation so as to thereby provide an accurate record of setback usage upon receipt of a request from the energy provider.

Figure 3A:
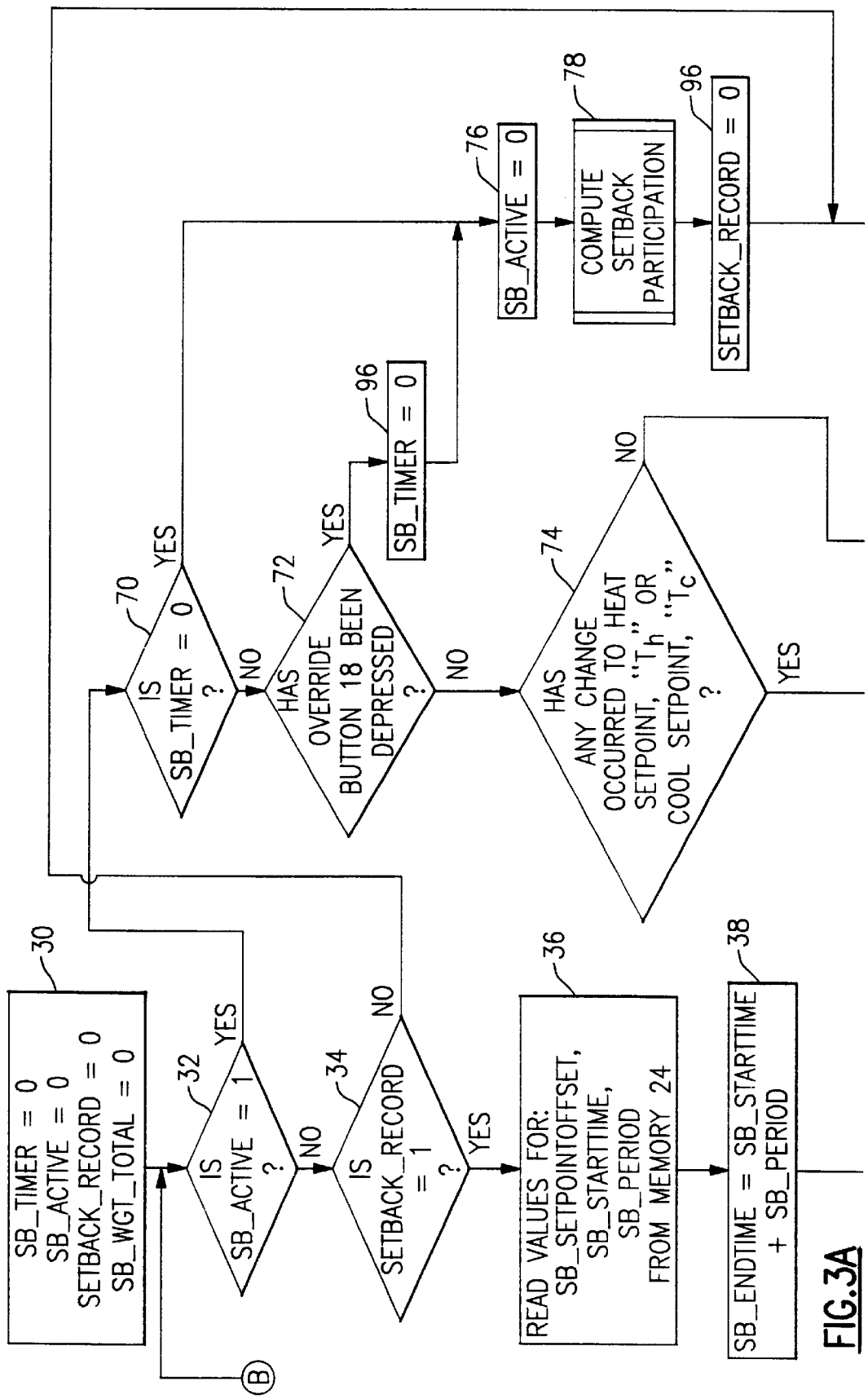
FIGS. 3A, 3B and 3C are a flowchart of the program implemented by the processor of FIG. 2 so as to respond to communications from the transceiver.
Figure 3B:
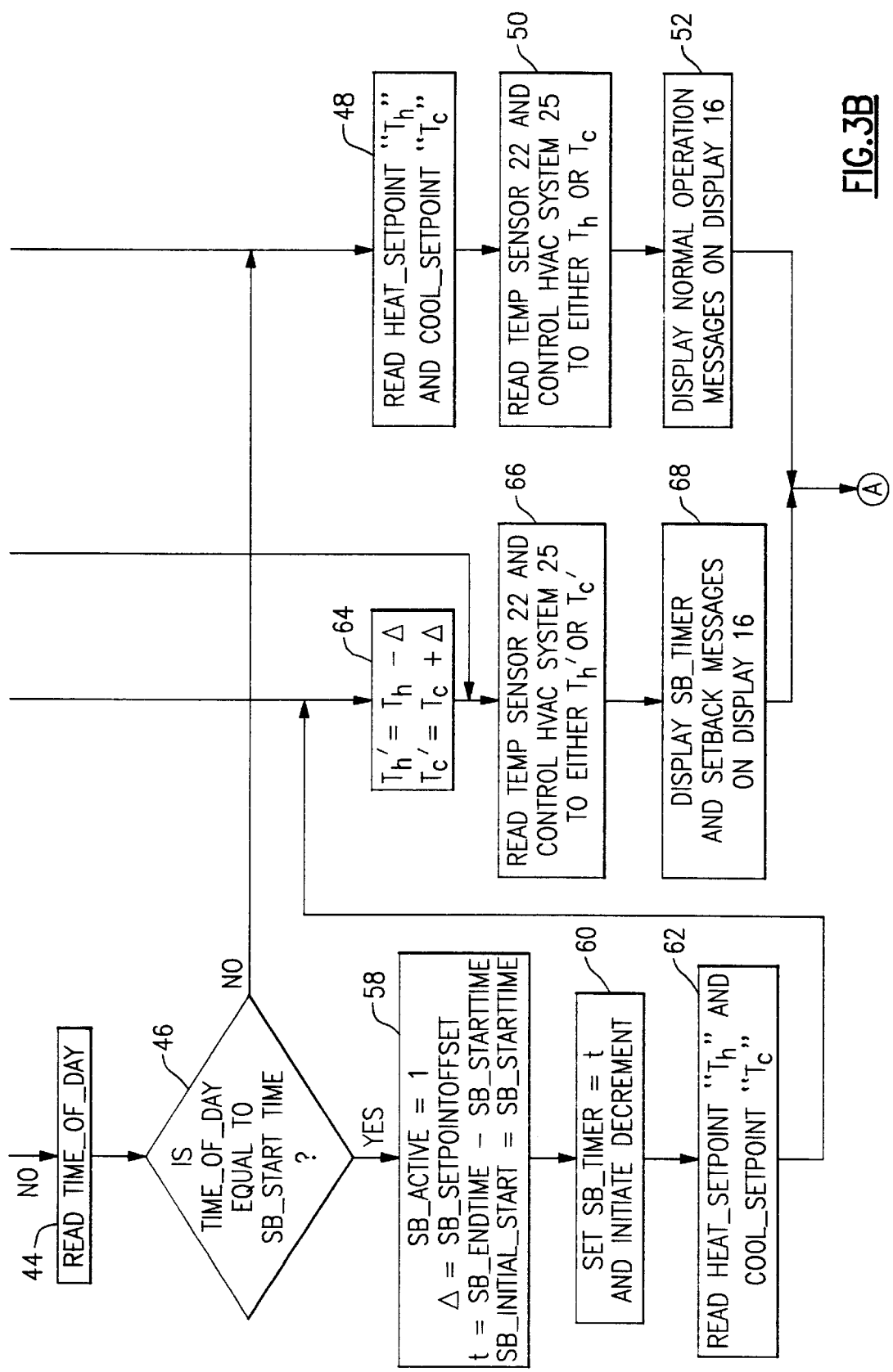
Figure 3C:
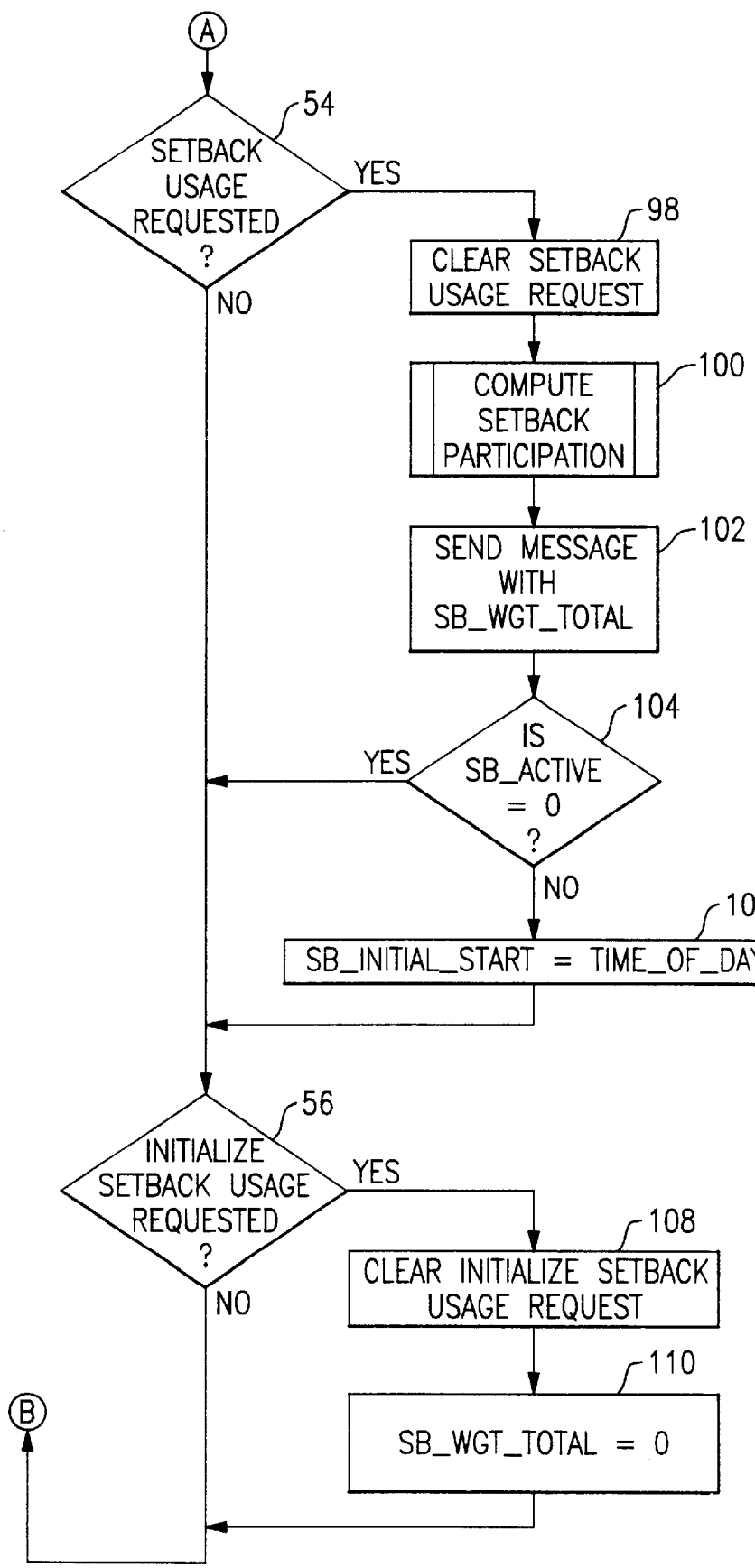

Referring to FIGS. 3A, 3B and 3C, a flowchart of the steps executed by the microprocessor 20 in response to receipt of information concerning setback or curtailment of locally entered setpoints is illustrated. As has been previously discussed, the microprocessor will receive this information from the transceiver 12 via the line 14. The flowchart begins with a step 30 wherein certain variables used by the program are initialized. These include SB_TIMER, SB_ACTIVE, SETBACK_RECORD and SB_WGT_TOTAL. The microprocessor proceeds from a step 30 to a step 32 and inquires as to whether SB_ACTIVE is equal to one. Since this variable will have been initially set equal to zero, the microprocessor would proceed to a step 34 and inquire as to whether the SETBACK_RECORD equals zero.

It is to be appreciated that the microprocessor 20 will independently of the program illustrated in FIG. 3, respond to a communication passed along by the transceiver 12 regarding any setback of the setpoint that may be requested by the energy provider.

The processor will set the variable SETBACK_RECORD equal to one when this occurs. The processor will also allocate and store certain received information pertaining to a requested setback in certain predefined variables which can be recalled by the program in FIG. 3. This will include allocating the amount by which the locally entered setpoints are to be adjusted or changed to a variable SB_SETPOINTOFFSET. This amount or change in setpoint temperature may either be a constant or a time variant change in setpoint temperature. The processor will also allocate the time in which the requested setback of the setpoints is to begin to a variable SB_STARTTIME. The processor will still furthermore allocate the amount of time during which the particular setback mode of operation is to occur to a variable SB_PERIOD.

Assuming that information pertaining to a setback request has been received, allocated and stored by the processor in the aforementioned variables, the processor will proceed along a yes path from step 34 to a step 36 and read the information for SB_SETPOINTOFFSET, SB_STARTTIME and SB_PERIOD as the same has been stored in memory 24. The processor will proceed to a step 38 and compute the value of SB_ENDTIME, which is the sum of SB_STARTTIME plus SB_PERIOD.

The processor will proceed from step 38 to a step 44 and read the "TIME_OF_DAY". This is preferably read from an internal system clock within the microprocessor, which tracks time by at least the total number of minutes in a twenty-four hour day. The processor proceeds from step 44 to step 46 and inquires as to whether the TIME_OF_DAY read in step 44 is equal to SB_STARTTIME.

Assuming that the time of day is not equal to SB_STARTTIME, the processor will proceed along a no path out of step 46 to a step 48 and read the currently stored values of heat setpoint, $T_h$ and cool setpoint, $T_c$. The microprocessor will thereafter proceed to step 50 and read the temperature sensor 22 and thereafter control the HVAC system 26 to either $T_h$ or $T_c$. It is to be appreciated that such control is defined by a separate control program, which reads the temperature sensor 22 and thereafter controls the HVAC system 26 so as to either achieve the heat setpoint $T_h$ or the cool setpoint $T_c$. It is to be appreciated that the setpoint which is used will depend on the HVAC system. If the HVAC system is, for example, a reversible heat pump, then the mode of operation of the heat pump will determine whether $T_h$ or $T_c$ is used. The processor will proceed to step 52 and display a message on the display 16 that the thermostat is in a "normal" mode of operation. The processor will proceed from step 52 through a junction A to a step 54 and inquire as to whether or not a request has been received for a report on setback usage by the thermostat. It is to be understood that such a request would normally be initiated by the energy provider and stored in the memory 24 for inquiry by the microprocessor in step 54. Assuming that no such setback usage has occurred, the processor will proceed along the no path to a step 56 and inquire as to whether a communication has been received from the energy provider requesting that setback usage be initialized. Assuming that such an initialization has not been requested, the processor will proceed along the no path to junction B and return to step 32.

Since the value of SB_ACTIVE is still zero, the processor will proceed through steps 34–46, as has been previously discussed. In the event that the read time of day in step 44 now equals SB_STARTTIME, the processor will proceed along the yes path out of step 46 to a step 58. Referring to step 58, the processor will first set the variable SB_ACTIVE equal to one. The processor will also set a variable Δ equal to SB_SETPOINTOFFSET. The microprocessor will still furthermore compute the value of a variable "t" as being equal to SB_ENDTIME minus SB_STARTTIME. The processor may again need to account for any transition between one day and the next when doing this computation. In this regard, SB_ENDTIME would need to be adjusted by the total time in one day in the event that SB_STARTTIME is near the end of one day and SB_ENDTIME occurs the next day.

The final computation within step 58 is to set SB_INITIAL_START equal to SB_STARTTIME. The processor will proceed to step 60 and set a software timer SB_TIMER equal to "t" and initiate a decrementing of the software timer. The processor will next proceed from step 60 to a step 62 and read the locally entered setpoints $T_h$ and $T_c$ from memory 24. The processor will next proceed to a step 64 and adjust the values of $T_h$ and $T_c$ by the value of the variable Δ at that point in time. This will effectively lower the heat setpoint $T_h$ by the amount of Δ and raise the cool setpoint $T_c$ by the amount Δ. The processor will proceed to step 66 and read the temperature sensor 22 and control the HVAC system 26 in accordance with either $T'_h$ or $T'_c$ as computed in step 64. In this manner, the HVAC control system will now be controlling the HVAC system to a lower heat setpoint or to a higher cool setpoint so as to thereby produce an incremental savings of energy costs. The processor will proceed to a step 68 and display the current value of SB_TIMER and a message indicating that the thermostat is in a curtailment or setback mode of operation. The processor will proceed through steps 54 and 56 in the event that neither setback usage or an initialization of setback usage have been requested by the energy provider.

The processor will again return to step 32 and inquire as to whether SB_ACTIVE is equal to one. Since SB_ACTIVE will have been set equal to one in step 58, the processor will proceed along the yes path to a step 70 and inquire as to whether the software timer, SB_TIMER, has been decremented to zero. Assuming that SB_TIMER is not equal to zero, the processor will proceed to a step 72 and inquire as to whether the override button 18 has been depressed. Assuming that the override button 18 has not been depressed, the processor will proceed to a step 74 and inquire as whether either the locally entered heat setpoint "$T_h$" or the locally entered cool setpoint "$T_c$" has changed between successive executions of the logic of FIG. 3. This is preferably accomplished by comparing the time of day with any user programmed setpoint change times in memory 24. If the time of day is within a very small predefined range of a programmed setpoint change time in memory 24, then the values of the new locally entered setpoints for the particular change time are read and stored as $T_h$ and $T_c$. The processor will then proceed to step 64 and adjust the new locally entered setpoints $T'_h$ and $T'_c$.

The processor will proceed either from step 74 or step 64 to step 66 and implement the control of the HVAC system 26, as has been previously described. The display will be updated in accordance with step 68 before proceeding through steps 54 and 56 in the event that setback usage has not been requested.

Referring again to step 32, the processor will again inquire as to whether SB_ACTIVE is equal to one. Since the thermostat is in a setback mode of operation, the processor will again proceed to step 70 and inquire as to whether the SB_TIMER equals zero. Assuming that SB_TIMER has now been decremented to zero, the processor will proceed along the yes path to a step 76 and set SB_ACTIVE equal to zero. The processor will proceed to a step 78 and initiate a sub-routine entitled "COMPUTE_SETBACK_PARTICIPATION". This particular sub-routine is illustrated in FIG. 4.

Figure 4:
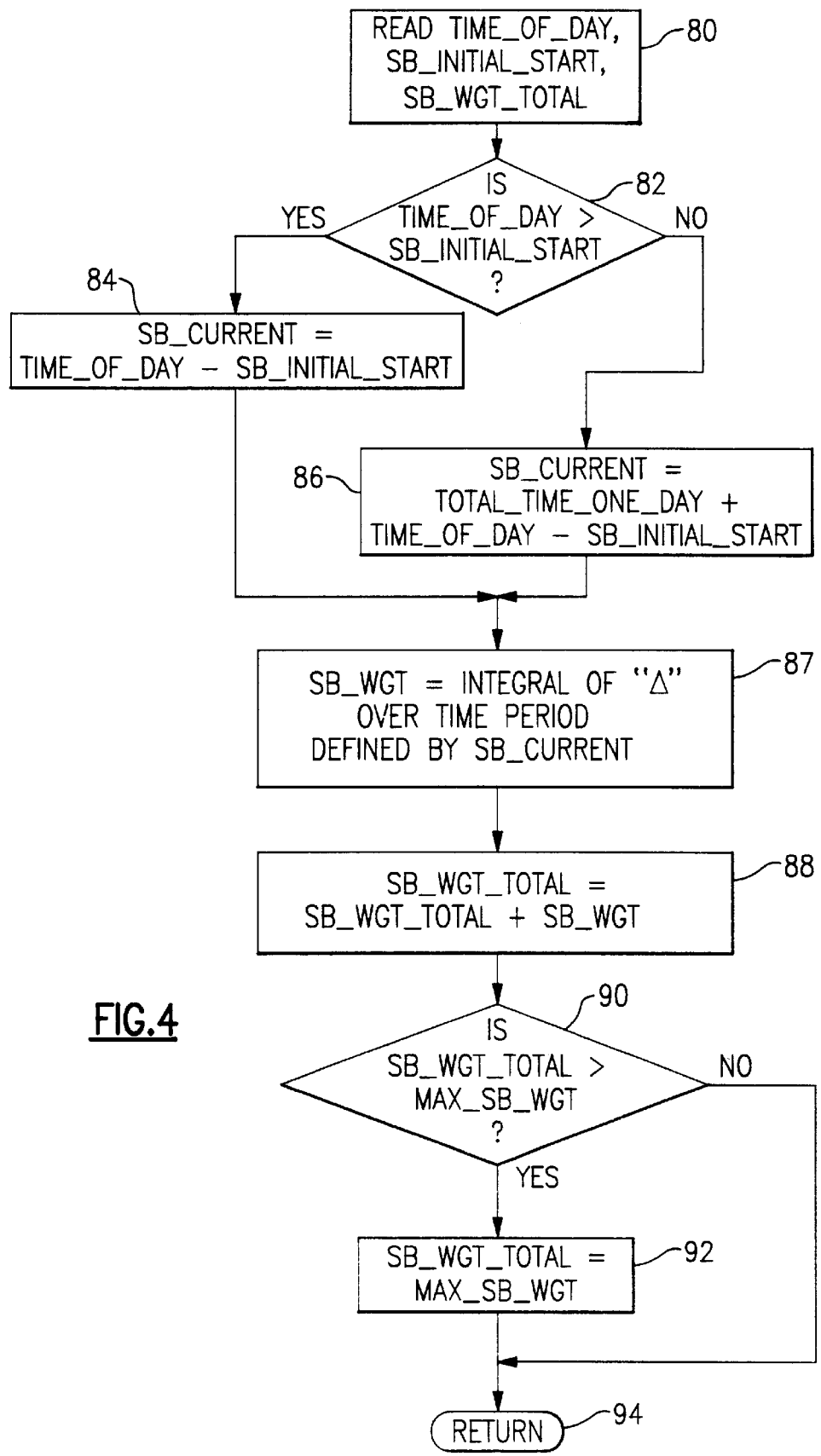
FIG. 4 is a flowchart of a sub-routine within the program of FIGS. 3A, 3B and 3C.

Referring to FIG. 4, the COMPUTE_SETBACK_PARTICIPATION sub-routine begins with a step 80 wherein the current time of day is read as well as the value of the variables SB_INITIAL_START and SB_WGT_TOTAL. It will be remembered that the value of SB_INITIAL_START will have been computed in step 58 to be equal to the TIME_OF_DAY read in step 44 when the thermostat enters a setback mode of operation. SB_WGT_TOTAL, on the other hand, will initially be equal to zero as required in step 30.

The processor proceeds from step 80 to a step 82 and inquires as to whether the currently read TIME OF DAY is greater than SB_INITIAL_START. In the event that the currently re ad TIME_OF_DAY is greater than SB_INITIAL_START, the processor will proceed along the yes path to a step 84 and compute the value of a variable denoted as SB_CURRENT. Referring to step 84, SB_CURRENT is equal to the TIME_OF_DAY as read in step 80 minus the value of SB_INITIAL_START. It is to be appreciated that this computation should yield the current amount of setback time that has expired since SB_ACTIVE was set equal to one in step 58. Referring again to step 82, in the event that the TIME_OF_DAY is not greater than SB_INITIAL_START, then the processor will proceed along the no path and compute the value of the SB_CURRENT variable in another manner. Specifically, SB_CURRENT will b e equal to the value of TOTAL_TIME_ONE_DAY plus TIME_OF_DAY minus SB_INITIAL_START. In this regard, the value of the variable TOTAL_TIME_ONE_DAY is the total amount of time in a given day expressed in terms of total number of minutes in the day or whatever unit of time is used in the particular embodiment. It is to be appreciated that the computation of SB_CURRENT in step 86 is necessary in the event that a transition has occurred from one day to the next following the time indicated by SB_INITIAL_START.

Referring now to step 87, the value of a variable SB_WGT is computed as a function of the determined value of SB_CURRENT out of either steps 84 or 86 and the variable $\Delta$. This mathematical function is preferably the integral of the variable $\Delta$ over the period of time defined by SB_CURRENT. It will be remembered that the variable $\Delta$ is defined in step 58 as being whatever information was stored in SB_SETPOINTOFFSET. It will furthermore be remembered that SB_SETPOINTOFFSET can either be a constant value for the requested change in setpoint temperature or a change in setpoint temperature which varies with time depending on the information received by the processor in response to processing a communication pertaining to a setback request. SB_WGT will hence be an integration of the variable $\Delta$ over the period of time dictated by SB_CURRENT when $\Delta$ is a change in setpoint temperature that varies with time. On the other hand, SB_WGT will simply be the product of a constant value multiplied by SB_CURRENT when $\Delta$ is a constant value for the change in setpoint temperature.

Referring now to step 88, SB_WGT_TOTAL is next computed as the sum of any previous value of SB_WGT_TOTAL plus the value of SB_WGT determined in step 87. Since SB_WGT_TOTAL was initially set equal to zero in step 30, the value of SB_WGT_TOTAL, as first computed in step 88, should merely be the value of SB_WGT as determined in step 87. It is, however, to be understood that if there have been previous setback modes of operation of the thermostat, then the value of SB_WGT_TOTAL out of step 88 will be equal to the previously determined SB_WGT_TOTAL plus the integral of the variable $\Delta$ over the period of time defined by SB_CURRENT in step 87.

The processor proceeds from the computation of SB_WGT_TOTAL in step 88 to step 90 wherein inquiry is made as to whether SB_WGT_TOTAL is greater than MAX_SB_WGT. MAX_SB_WGT is preferably a value set by the energy provider as the maximum amount of setback time weighted by temperature offset that may be claimed by the user of the thermostat during any one particular billing period. This value may be hard coded into the software or it may be transmitted to the thermostat at any point in time and stored in the memory 24 for use when step 90 is encountered. In the event that the SB_WGT_TOTAL exceeds MAX_SB_WGT, the processor proceeds to step 92 and sets SB_WGT_TOTAL equal to MAX_SB_WGT. Otherwise, the microprocessor proceeds along the no path out of step 90 to return step 94. The processor proceeds out of the sub-routine of FIG. 4 back to step 78 wherein the processor proceeds to step 96 and sets SETBACK_RECORD equal to zero.

The processor proceeds from step 96 to step 48 wherein the locally programmed setpoints $T_h$ and $T_c$ are read before proceeding to step 50 to control the HVAC system in accordance with the appropriate locally entered setpoint $T_h$ or $T_c$. In this regard, the processor will have left the setback mode of operation and will now be using normal local unit setpoints to control the HVAC system. The processor will proceed through steps 52, 54, and 56, as has been previously described, before returning to step 32. Since SB_ACTIVE will have been previously set equal to zero in step 76, the processor will proceed along the no path out of step 32 to inquire as to whether SETBACK_RECORD equals one. If it does not, the microprocessor will proceed along the no path to step 48 and again execute steps 48–56, as has been previously described.

Referring again to step 34, in the event that SETBACK_RECORD is equal to one at some point, then the processor will again read the values of SB_SETPOINTOFFSET, SB_STARTTIME, and SB_PERIOD from the memory 24 in step 36. The processor will next proceed through steps 36–46 to determine whether the current TIME_OF_DAY is equal to SB_STARTTIME. Assuming that at some point TIME_OF_DAY is equal to SB_STARTTIME, the processor will proceed through steps 58–68 and hence through 54–56 as has been previously discussed. The processor will, on the next execution of the logic of FIG. 3, proceed back through step 32 and now exit along the yes path to step 70. Assuming that the SB_TIMER is not equal to zero, the processor will proceed to a step 72 and inquire whether the override button 18 has been depressed. It will be remembered that the override button 18 will have been depressed in the event that the user wishes to override the setback mode of operation, as displayed on the display 16. If this occurs, the processor will proceed along the yes path out of step 72 and set SB_TIMER equal to zero in a step 96. The processor will proceed to set SB_ACTIVE equal to zero in step 76 before proceeding in step 78 to the sub-routine for computing setback participation of FIG. 4.

Referring to FIG. 4, the current TIME_OF_DAY as well as the values of SB_INITIAL_START and SB_WGT_TOTAL will be read in step 80. Inquiry will next be made as to whether the TIME_OF_DAY is greater than SB_INITIAL_START and the appropriate computation of SB_CURRENT thereafter will be made in either step 84 or 86. The value of SB_WGT and SB_WGT_TOTAL will again be computed in steps 87 and 88. Since the processor has previously computed a value of SB_WGT_TOTAL, the computation in step 88 will be the previous value of SB_WGT_TOTAL plus the value of SB_WGT computed in step 87. The thus computed value of SB_WGT_TOTAL will be compared to MAX_SB_WGT in step 90 and appropriately capped in step 92, if necessary. The processor will proceed to return to step 78 and thereafter proceed through steps 96 and 48–54. Assuming that a setback usage request has not been received in step 54, the processor will proceed through steps 54 and 56 and return to step 32, as has been previously discussed.

Referring again to step 32, it is to be appreciated that at some point in time during the successive executions of the logic of FIG. 3, another SETBACK_RECORD flag equal to one may occur. When this happens, SB_SETPOINTOFFSET and SB_STARTTIME and SB_PERIOD will again be read from the memory 24 in step 34. At some point the TIME_OF_DAY will again be equal to SB_STARTTIME. The processor will now enter into a setback mode of operation by setting SB_ACTIVE equal to one in step 58. The processor will proceed through steps 60, 62, 64, 66 and 68, as has been previously described, before encountering step 54. Assuming that a setback usage request has been made and stored in the memory 24, the processor will proceed out of step 54 to step 98 and clear the thus stored setback usage request in memory 24. The processor will proceed to step 100 and implement the setback participation sub-routine of FIG. 4. As has been previously discussed, the TIME_OF_DAY will be read and compared with SB_INITIAL_START before computing the value of SB_CURRENT in either step 84 or 86. The processor will proceed in steps 87 and 88 to compute the value of SB_WGT and SB_WGT_TOTAL. The thus computed value of SB_WGT_TOTAL will be clamped at MAX_SB_WGT, if necessary, in step 92 before returning to step 100. The processor will proceed from step 100 to step 102 wherein a message will be sent to the transceiver 12, which will in turn communicate with the energy provider's receiving device. The message will include the value of SB_WGT_TOTAL. The processor will next proceed to step 104 and inquire as to whether SB_ACTIVE is equal to zero. It will be remembered that the request for setback usage was encountered during a time in which the setback mode of operation was in effect. SB_ACTIVE would hence still be equal to one prompting the processor to proceed from step 104 to step 106. Referring to step 106, the variable SB_INITIAL_START will be set equal to the currently read time of day from the system clock. This will, essentially, set a new SB_IN_INITIAL_START that is equal to the presently read TIME_OF_DAY. The processor will proceed from step 106 to step 56.

Referring to step 56, it is to be noted that this step may also be encountered out of step 104. The processor will have proceeded out of step 104 to step 56 in the event that the thermostat was no longer in a setback mode of operation, as indicated by SB_ACTIVE being equal to zero. The processor will proceed to inquire in step 56 as to whether an initialization of setback usage request has been received and stored in the memory 24. This particular request message will possibly be transmitted by the energy provider when the energy provider wishes to start the computation of SB_WGT_TOTAL all over again from zero. If this message has been received, then the processor will proceed along the yes path to a step 108 and clear the initial setback usage request stored in memory 24.

The processor will then proceed to step 110 and set SB_WGT_TOTAL equal to zero. The processor will proceed from step 110 through junction B back to step 32. Referring again to step 56, in the event that a request to initialize the setback usage has not been received, the processor will proceed directly to step 32. It is thus to be appreciated that the processor may have sent a message to the energy provider in step 102 without initializing SB_WGT_TOTAL if the processor has not received the initialized setback usage request. On the other hand, if the processor has received the initialized setback usage request, then the SB_WGT_TOTAL will be set equal to zero in step 110.

Referring again to step 32, inquiry is made as to whether SB_ACTIVE is equal to one. It is to be appreciated that SB_ACTIVE may either be one or zero after having processed a usage request through steps 98–110. Assuming that SB_ACTIVE is still equal to one, then the processor will proceed along the yes path to step 70 and inquire as to whether SB_TIMER equals zero. It will be remembered that SB_TIMER has been continually decrementing towards zero since having been initially set equal to "t" in step 60. This decrementing of the SB_TIMER will occur regardless of whether or not a setback usage request has been processed in steps 98–100. At some point, the SB_TIMER will be decremented to zero when step 70 is encountered. When this occurs, the processor will proceed along the yes path to step 76 and set SB_ACTIVE equal to zero before implementing the computation of setback participation in step 78. Referring to the sub-routine for computing setback participation in FIG. 4, the processor will again read the TIME_OF_DAY as well as the values of SB_INITIAL_START and SB_WGT_TOTAL. It will be remembered that SB_INITIAL_START will have been set equal to the TIME_OF_DAY occurring when step 106 is executed. This will be a different SB_INITIAL_START than would have been normally carried by the processor as a result of implementing step 58. In other words, SB_INITIAL_START will now be whatever TIME_OF_DAY it was when the setback usage request was processed. The processor will proceed to inquire whether or not the read time of day in step 80 is greater than the value of SB_INITIAL_START in step 82. As has been previously discussed, SB_CURRENT will be computed out of step 82 in either step 84 or 86. SB_WGT and SB_WGT_TOTAL will now be computed in steps 87 and 88. Referring to steps 98 110, it will be appreciated that the previous value of SB_WGT_TOTAL will either be whatever has been computed previously during previous executions of the logic or SB_WGT_TOTAL will have been previously set equal to zero in step 110. In this latter case, SB_WGT_TOTAL will be equal to zero in step 110 as a result of a received message from the energy provider to initialize the setback usage out of step 56. It is hence to be appreciated that SB_WGT_TOTAL as computed in step 88 will either be a continuing accumulation of previous SB_WGT_TOTAL values in conjunction with the computation of SB_WGT in step 87 or it will be a new SB_WGT_TOTAL starting from an SB_WGT_TOTAL of zero. It is to be furthermore appreciated that any subsequent computation of SB_WGT in step 87 will include computing the integral of the variable Δ over the period of time, SB_CURRENT. SB_CURRENT in this case will be any remaining portion of a setback mode of operation that is implemented after SB_INITIAL_START is set equal to TIME_OF_DAY in step 106 and SB_WGT_TOTAL is cleared in step 110.

It is to be appreciated that a preferred embodiment of a program for tracking and reporting setback usage has been disclosed. Alterations and modifications to the thus disclosed program may occur without departing from the scope of the invention. Accordingly, the foregoing description of a preferred embodiment is to be limited by the following claims and equivalents thereto.

What is claimed is:

1. A process executable by a programmed processor within a thermostat for tracking and reporting the participation by the thermostat in requested setbacks of the setpoint temperature for the thermostat, said process comprising the steps of:
   responding to a request from a requesting entity to enter into a setback mode of operation whereby at least one setpoint used in a normal mode of operation is changed;
   tracking the amount of time that elapses during the setback mode of operation; and
   responding to a request from the requesting entity for an indication as to the amount of change in setpoint temperature that has occurred over time, said step of responding comprising the steps of:
      computing the integral of change in setpoint temperature over time, and
      transmitting the computed integral of change in setpoint temperature over time to the requesting entity.

2. The process of claim 1 further comprising the steps of:
   monitoring any termination of the requested setback mode of operation; and
   computing the integral of the change in setpoint temperature over the time that has elapsed in the setback mode of operation before termination of the setback mode of operation.

3. The process of claim 2 further comprising the steps of:
   noting a request from the requesting entity for an indication as to the amount of change in setpoint temperature that has occurred over time; and
   transmitting the computed integral of the change in setpoint temperature over the time that elapsed in the setback mode of operation before termination of the setback mode of operation to the requesting entity.

4. The process of claim 1 wherein said change in setpoint temperature is a constant offset in setpoint temperature and wherein said step of computing the integral of change in setpoint temperature over time comprises the steps of:
   noting the elapsed period of time in the setback mode of operation; and
   multiplying the elapsed period of time by the constant offset in setpoint temperature so as to thereby define a time weighted temperature offset.

5. The process of claim 1 further comprising the steps of:
   noting whether a request has been received to clear the computed integral of change in setpoint temperature over time; and
   clearing the computed integral of change in setpoint temperature over time in response to receiving the clearing request.

6. A process executable by a programmed processor within a thermostat for tracking and reporting the participation by the thermostat in requested setbacks of the setpoint temperature for the thermostat, said process comprising the steps of:
   noting a request for an indication as to the amount of change in setpoint temperature that has occurred over time during any present and past setback modes of operation;
   computing the integral of change in setpoint temperature over time in any presently occurring setback mode of operation;
   combining the computed integral of change in setpoint temperature with computed integrals of change in setpoint temperature that have occurred over time during past setback modes of operation; and
   transmitting the combined computed integrals of change in setpoint temperature to the requesting entity.

7. The process of claim 6 wherein the change in setpoint temperature during the presently occurring setback mode of operation is a constant offset in setpoint temperature and wherein said step of computing the integral of change in setpoint temperature over time during any presently entered setback mode of operation comprises the steps of:
   noting the elapsed period of time in the presently entered setback mode of operation; and
   multiplying the elapsed period of time by the constant offset in setpoint temperature so as to thereby define a time weighted temperature offset.

8. The process of claim 6 further comprising the steps of:
   noting whether a request has been received to clear an indication as to the amount of change in setpoint temperature that has occurred over time during any present and past setback modes of operation; and
   clearing the combined computed integrals of change in setpoint temperature in response to receiving the clearing request.

9. A thermostat having the capability to track and report the participation by the thermostat in requested setbacks of the setpoint temperature for the thermostat, said thermostat comprising:
   a memory for storing information;
   a processor operative to receive at least one communication requesting that the thermostat enter into a setback mode of operation whereby at least one setpoint used in a normal mode of operation is changed, said processor being operative to respond to a request from the requesting entity for an indication as to the amount of change in setpoint temperature that has occurred over time by computing the integral of change in setpoint temperature over time and transmitting the computed integral of change in setpoint temperature over time to the requesting entity.

10. The thermostat of claim 9 wherein said processor is furthermore operative, in response to a request from the requesting entity for an indication as to the amount of change in setpoint temperature that has occurred over time, to combine the computed integral of change in setpoint temperature with computed integrals of change in setpoint temperature that have occurred over time during past setback modes of operation and transmit the combined computed integrals of change in setpoint temperature to the requesting entity.

11. The thermostat of claim 9 wherein said processor is furthermore operative to monitor any termination of a requested setback mode of operation and to note the time that has elapsed in such a terminated setback mode of operation so as to thereafter compute the integral of the change in setpoint temperature over the time that has elapsed in the setback mode of operation before termination of the setback mode of operation.

12. The thermostat of claim 9 wherein the change in setpoint temperature during the entered setback mode of operation is a constant offset in setpoint temperature and wherein said processor is operative to compute the integral of change in setpoint temperature over time during the presently entered setback mode of operation by noting the elapsed period of time in the presently entered setback mode of operation and multiplying the elapsed period of time by the constant offset in setpoint temperature in the setback mode of operation.

13. The thermostat of claim 9 wherein said processor is furthermore operative to respond to a communication requesting that the indication as to the amount of change in setpoint temperature that has occurred over time be cleared whereby the indication as to the amount of change in setpoint temperature that has occurred over time is set to zero.

14. The thermostat of claim 13 wherein said processor is furthermore operative to compute any remaining period of time that elapses in the setback mode of operation occurring when the indication as to the amount of change in setpoint temperature that has occurred over time is set equal to zero and wherein said processor is still furthermore operative to compute the integral of change in setpoint temperature over any time remaining in the entered setback mode of operation so as to define a new indication as to the amount of change in setpoint temperature that has occurred over time following the clearing of the previous indication as to the amount of change in setpoint temperature that has occurred over time to zero.

* * * * *